United States Patent
Kauffmann

[11] Patent Number: 6,125,957
[45] Date of Patent: Oct. 3, 2000

[54] PROSTHETIC APPARATUS FOR SUPPORTING A USER IN SITTING OR STANDING POSITIONS

[76] Inventor: Ricardo M. Kauffmann, Prolong Americas 334, Zapopan, Guadalajara, Jalisco, Mexico

[21] Appl. No.: 09/021,535

[22] Filed: Feb. 10, 1998

[51] Int. Cl.[7] .................................................. B60K 1/00
[52] U.S. Cl. ..................... 180/65.1; 180/65.5; 180/907; 297/DIG. 10
[58] Field of Search ..................................... 180/6.5, 65.1, 180/65.5, 65.8, 6.48, 907; 5/81.1 R, 83.1, 86.1; 297/330, 331, DIG. 4, DIG. 10

[56] References Cited

U.S. PATENT DOCUMENTS

| | | |
|---|---|---|
| 4,054,319 | 10/1977 | Fogg, Jr. et al. . |
| 4,456,086 | 6/1984 | Wier et al. . |
| 4,809,804 | 3/1989 | Houston et al. . |
| 5,265,689 | 11/1993 | Kauffmann . |
| 5,366,036 | 11/1994 | Perry .................................. 180/907 |
| 5,772,226 | 6/1998 | Bobichon ........................... 180/907 |
| 5,791,425 | 8/1998 | Kamen et al. ..................... 180/907 |

*Primary Examiner*—Richard M. Camby
*Attorney, Agent, or Firm*—Boniard I. Brown

[57] ABSTRACT

A prosthetic apparatus is electrically operable by a user for lifting the user into standing position and lowering the user into a sitting position by power means operated by the user, the apparatus being a motorized wheelchair.

23 Claims, 6 Drawing Sheets

PROSTHETIC APPARATUS FOR SUPPORTING A USER IN SITTING OR STANDING POSITIONS

BACKGROUND AND SUMMARY OF THE INVENTION

The present invention relates generally to prosthetic devices, and more particularly to an improved mobile prosthetic device operable for supporting a user in sitting and standing positions.

Persons confined to wheelchairs become uncomfortable and psychologically depressed in prolonged periods of being seated, and situations wherein being seated is inappropriate. It is more comfortable and involves less stress for such users to stand in appropriate situations, and to periodically assume an upright, standing position. In situations where other persons are seated, there is less of a problem. In situations where it is inappropriate to be seated, as in some work environments, business or social circumstances, a user can best perform and feel more comfortable when in a standing position.

Certain prior prosthetic devices provide for sitting and standing positions of users. These have involved such problems as excessive complexity, high manufacturing costs, excessive size and weight, lack of fully effective systems for assuming standing and sitting positions and other shortcomings. The improved prosthetic apparatus according to the invention addresses such problems and shortcomings by providing a prosthetic apparatus for the positioning and support of a user in standing and in seated positions. The apparatus includes a base with front and rear wheels, the front wheels being pivotable, and the rear wheels being separately powered for controlling the direction of rotation and the speed of each of the rear wheels to control forward and rearward movement, and for steering. Lifter means including a piston on the base, a movable member in telescoping relation with the piston, is operable by mechanical drive means to move the movable member relative to the piston. User controlled electrical power means for operating the lifter means urges a movable member upwardly and downwardly. Electrical power means are controllable by the user by moving the movable member and a seat between the user-standing and user-seated positions, and for controlling movement of the apparatus by selective powering of respective rear ground wheels. The support frame mounted on the movable member has a seat at its rear edge portion pivotally mounted on the movable member, and with the front or outer edge portion of the seat being pivotally connected with the base for movement of the seat between its extended user-seated position and its retracted user-standing position.

DESCRIPTION OF THE PREFERRED EMBODIMENT

Referring to the drawings, and particularly to FIGS. 1–4, a preferred embodiment of the present invention is shown as generally comprising a mobile standing-sitting wheelchair apparatus 10 which generally comprises a wheeled frame or base 12, an extensible lifter assembly 14 mounted on the frame, support arms 16 mounted on the lifter, a seat structure 18 pivotally mounted on an outer movable member 17 of the lifter 14, and a knee support 20 secured by a bracket to a movable member 17 of lifter 14.

The lifter 14 has an inner fixed member or rod 15 of rectilinear cross-section from which its end portion is rigidly mounted in a socket 19 rigidly mounted on arms 34 which extend between longitudinal frame members 22 of the base 12. Between longitudinal bars 22 are mounted, as by welding, U-section channels 24, as shown. Front ground wheels 26 are swivelly mounted at front corners of the base frame, and the rear ground wheels are power-driven drive wheels, as further hereinafter described. Movable member 17 and fixed member 15 are in telescopic relation, outer member 17 being movable to raise and lower the seat structure and other components between user-seated configuration and user-standing configuration. The lifter outer member 17 and the fixed member 15 are rectilinear in cross-section and retain the movable member 17 against rotation relative to the member 15.

The user, by operating control means hereinafter described, controls the electrically powered lifter mechanism for selective activation to raise or lower movable member 17 to raise the apparatus into user-standing position or to lower it into user-seated configuration, and controls the drive system to propel and to steer the apparatus. Movable member 17 is actuable relative to stationary member 15 (referring to FIGS. 7 and 8) by the operation of electrical motor means 62, reduction gear 63 (FIG. 5) and lead screw 70.

A knee support 38 is rigidly mounted on movable member 17 by arm 20 secured at 36 by screws to member 17 (FIGS. 1 and 3) thus to move the knee support with member 17. The user's knees are positioned against laterally extended arms of knee support 38, while in standing position, and are cushioned by the padding thereon, thus to provide support for the user in standing position by preventing bending of the knees. While in seated position, the user's legs are positioned forwardly of the knee supports (FIG. 2).

Figures 5, 6, 7:
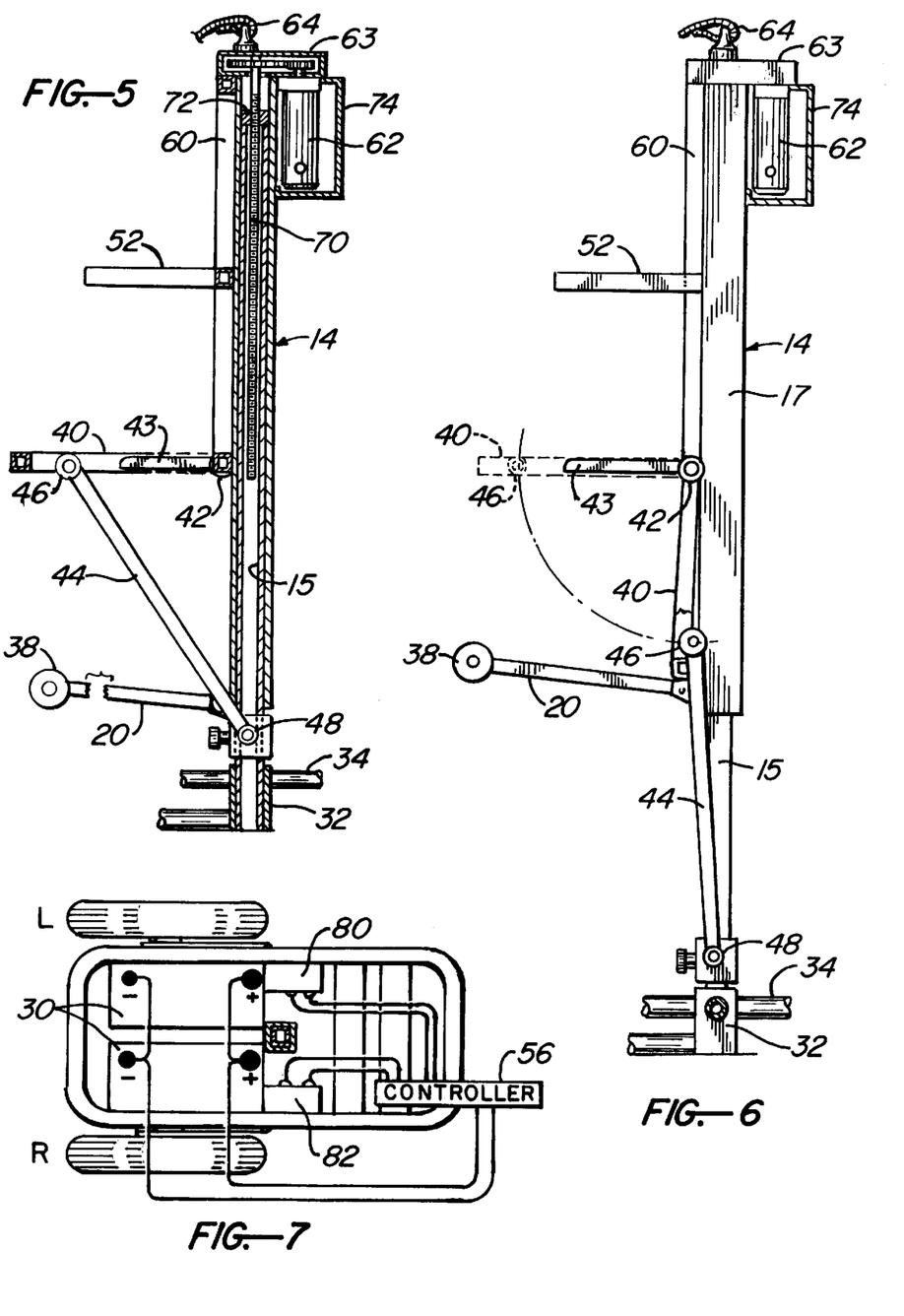
FIG. 5 is an elevational view, partially in section, of a lifter assembly and seat mechanism according to the invention.
FIG. 6 is a side elevational view of components of the apparatus of FIGS. 1–4 showing a seat mechanism in different positions.
FIG. 7 is a circuitry diagram in relation to batteries and wheels according to the invention.

Seat assembly 18 (FIG. 3) includes a frame 40 pivotally secured along its rear edge at 42 to the member 17 by a hinge arrangement 42, as shown. Seat struts 44 are pivotally attached at their upper ends at 46 by a hinge to the member 17 (FIG. 6). At their lower ends, the struts are pivotally mounted at 48 (FIG. 6) to a mounting member 49 adjustably secured by a locking screw to the stationary member 15 of the lifter. The pivot axes of the hinges are substantially parallel.

The seat struts are longitudinally aligned on an axis parallel to the longitudinal axis of the lifter, and the seat is retracted upwardly into a generally vertical position.

Figure 1:
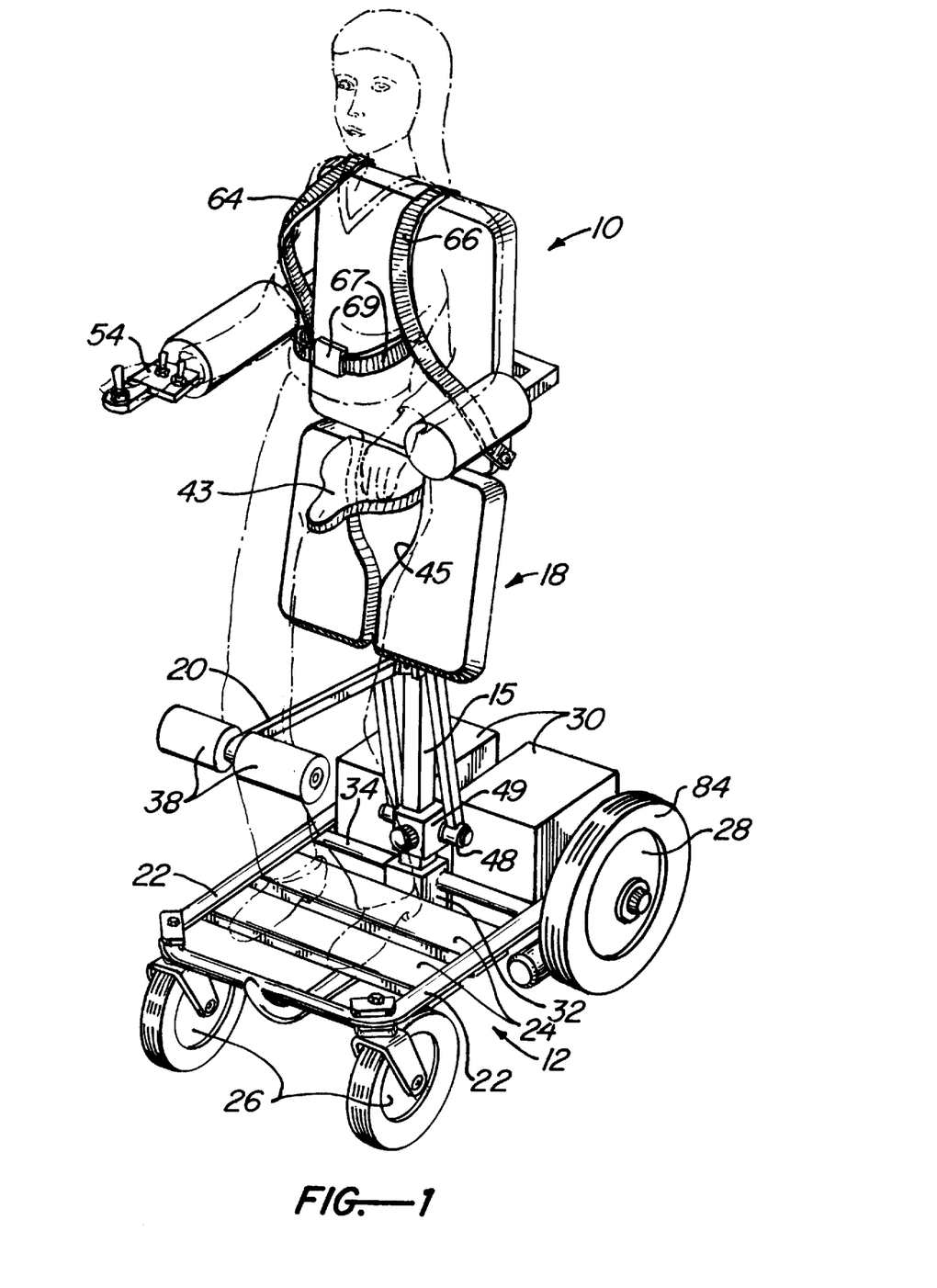
FIG. 1 is a perspective view of the prosthetic device according to the invention showing the user in standing position, in phantom outline.
Figure 2:
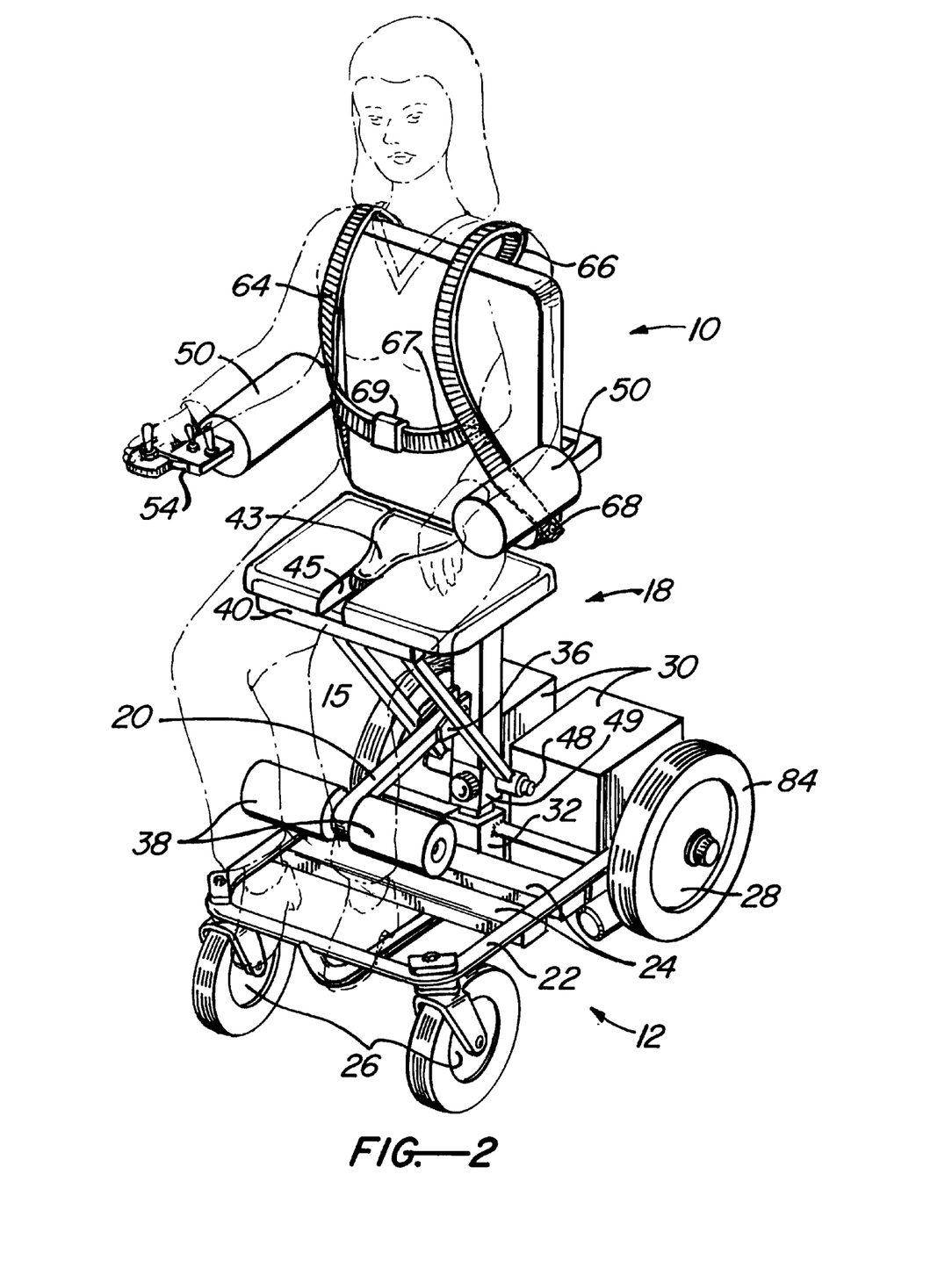
FIG. 2 is a perspective view of an apparatus according to the invention wherein a user is shown in seated position in phantom outline.
Figure 3:
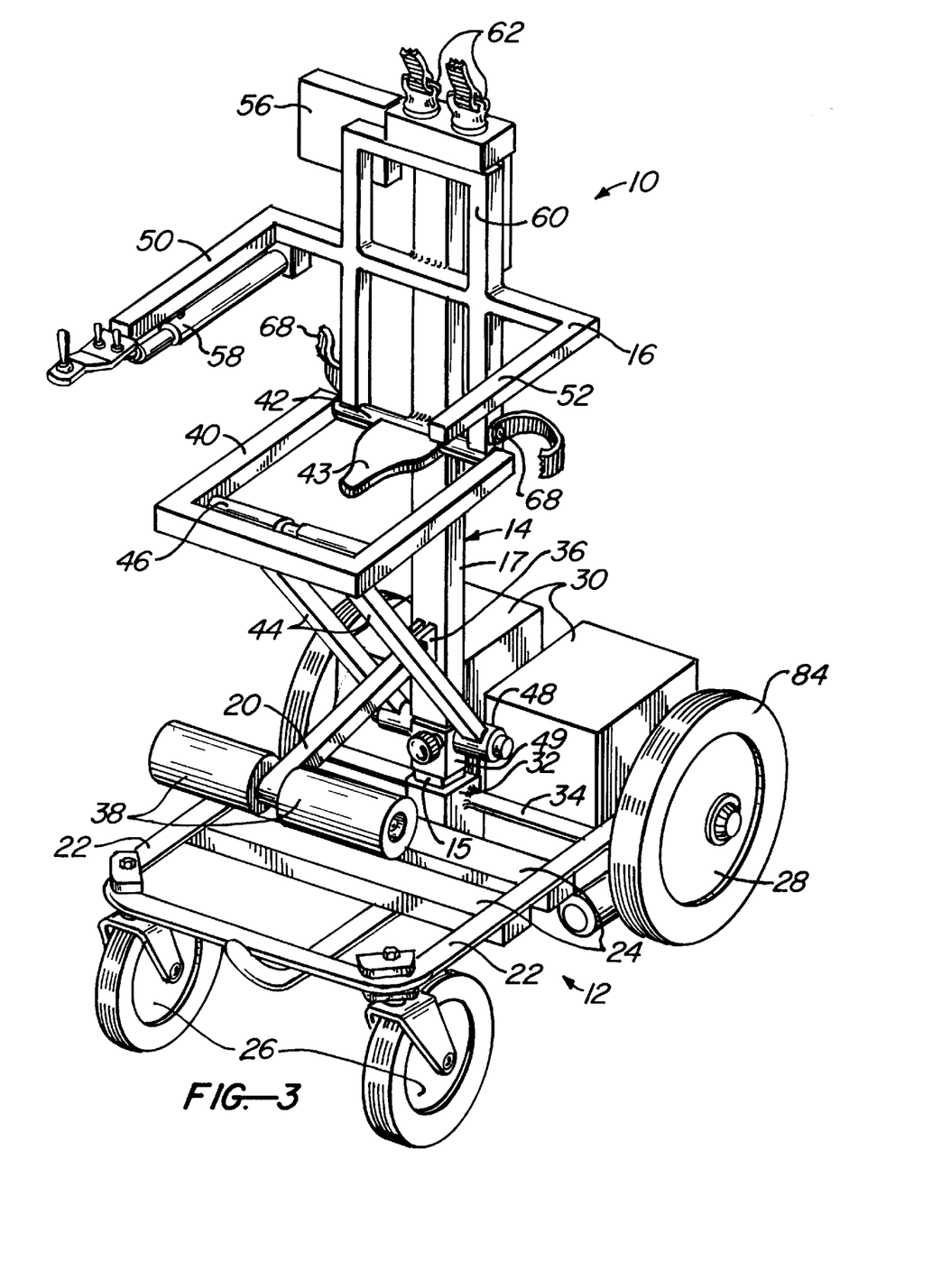
FIG. 3 is a perspective view showing components of the apparatus of FIGS. 1 and 2.
Figure 4:
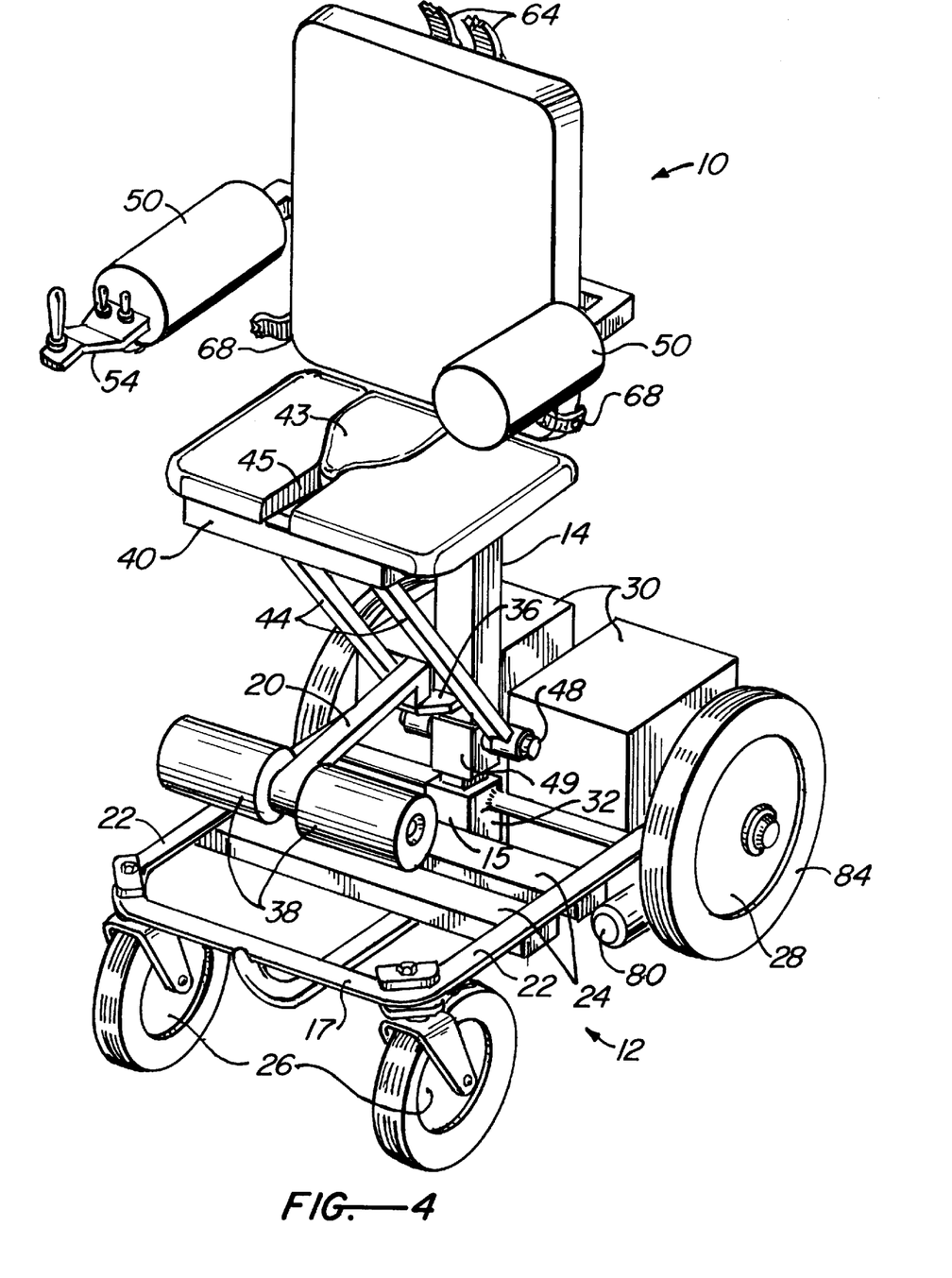
FIG. 4 is a perspective view showing the apparatus of FIGS. 1–3 with the cushions thereon.

During upward extension of movable member 17, the seat undergoes combined rearward edgewise translation and rotation to its retracted user-standing position of FIG. 1. During lowering of the lifter member 17 from its upper position to its lower retracted position, the seat struts rotate clockwise about their hinges and the seat undergoes combined rotation and forward edgewise translation from its solid line position of FIG. 5 into its retracted position of FIG. 6.

A pelvic support 43 is fixedly secured to movable member 17 and does not pivot with seat frame 40. It is preferably of the general configuration of a bicycle seat (FIGS. 1 and 2). With the seat in its user-seated position, the pelvic support fits in an opening 45 of compatible configuration in the seat (FIG. 2), and forms part of the seat. With the user in standing position, the pelvic support extends under the buttocks and, to a degree, between the legs of the user, thus to provide support and to assist in positioning the user.

A restraint belt assembly includes shoulder belts 64, 66 which extend about the user's shoulders, and which are anchored at their upper end portions by anchor members 62 to gear box 63 (FIG. 5) and are anchored at their lower ends to the frame 68 adjacent the feet. Secured to and extending between the belts 64 and 66 is a transverse belt 67 which has outer end portions releasibly secured together by a manually operable locking mechanism 69 such as that commonly used.

Figure 8:
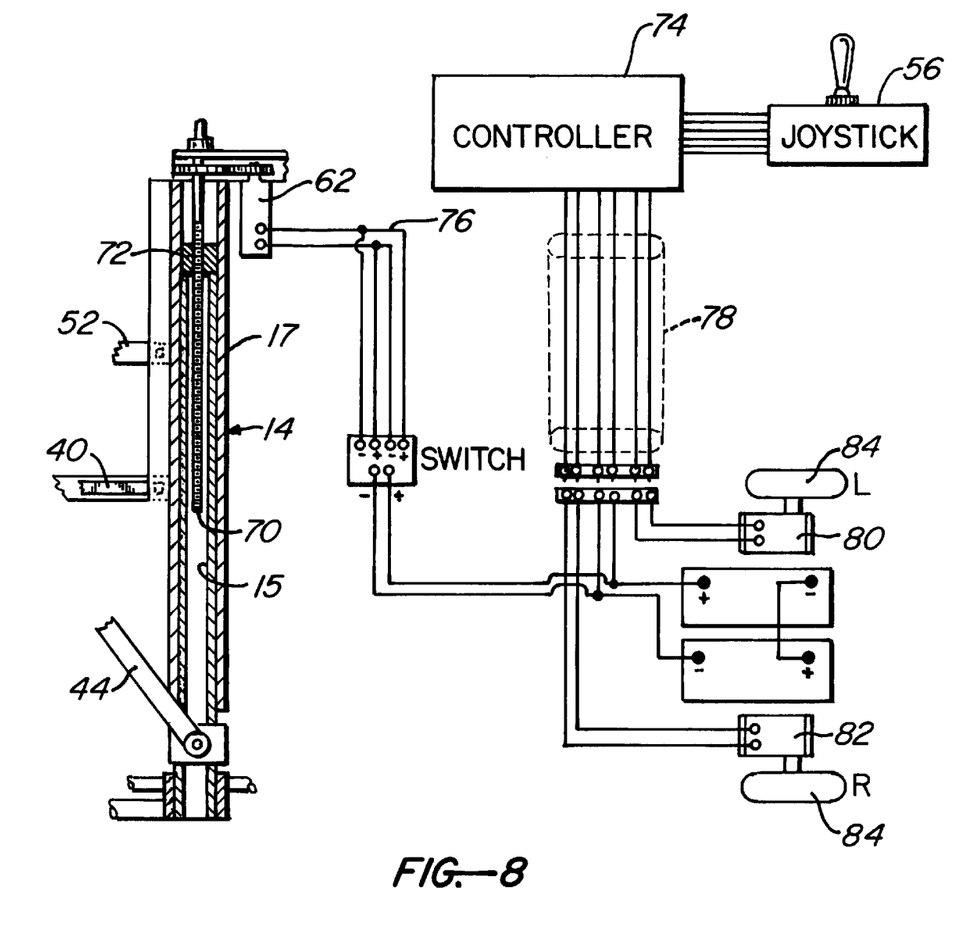
FIG. 8 is a diagramatic showing of electrical circuitry in relation to a lifter mechanism according to the invention.

Referring to FIGS. 7 and 8, the control system includes the joy-stick assembly 54 and control unit 74 adjacent to electric motor 62 on the upper rear of the frame. The control unit includes and electrically interconnects electrical switching and motor speed control means within the control unit. The system includes the batteries 30 and rear wheel drive motors 82, 84.

In operating the apparatus, a user sits with his back against the cushioned rear upper frame 60 with arms supported on the cushioned arm members 50, 52 which extend generally horizontally and are parts of the upper frame structure. The user's hand is thus positioned adjacent the joy-stick assembly 54, which has a telescopic adjustment 58 (FIG. 3) for positioning to accommodate the user. To assume a standing position, the user operates the joy-stick to operate the control unit to energize the electric motor 62 to rotate via the gears of gear box 63 the lead screw 70 to effect upward movement of outer movable member 17 (FIG. 5) by engagement with a threaded mounting member 72 on the movable member 17. To return to a sitting position, the user operates the joy-stick to operate the control unit and electric motors to operate the lead screw in a reverse direction to lower movable member 17. By operating the joy-stick and control unit, the user operates and moves the apparatus forwardly and rearwardly, and accomplishes steering, by operation of the motors 82, 84 at the same time to effect forward or rearward movement, or by operating only a single motor, or by operating the motors in different directions at the same time, the speeds of the drive motors being separately controlled. That is, the wheelchair is driven forwardly and rearwardly by actuating the control unit to energize both drive motors in either forward or reverse directions in a straight line, and steering is accomplished by operating the motors in different speeds, or by operating the motors in different directions at the same time.

The electrical arrangement includes the control unit 74 connected by a switch and a first cable 76 to the electric motor, and a second electric cable 78 has a plug for insertion into a socket to connect the control unit to the batteries and to rear wheel drive motors 82, 84. The control unit has elements which operate the switching and motor control means, which are readily selectively operable by a user by operation of the joy-stick assembly 54.

Thus there has been shown and described a prosthetic apparatus for transporting a user in sitting or standing positions which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

What is claimed is:

1. A prosthetic apparatus for positioning, moving and supporting a user in standing and seated positions, comprising:

a base having ground wheels, a fixed member extending upwardly from the base, and a movable lift member disposed for movement relative to the fixed member, a mechanical drive mechanism having interengaging components on the fixed member and movable lift member, said components comprising a lead screw for moving said movable lift member relative to the fixed member, a drive motor controllable by the user to operate said mechanical drive mechanism to urge the lift member relative to the fixed member, a seat having front and rear edge portions, said rear edge portion being pivotally mounted relative to the movable lift member, at least one strut pivotally connected with the seat front edge portion and pivotally connected with the fixed member for movement of the seat between an extended user-seated position and a retracted user-standing position, and an electrical controller operable by the user for moving the movable member and said seat between user-standing and user-seated positions, and for controlling movement of the apparatus by selective powering of certain of said ground wheels.

2. A prosthetic apparatus according to claim 1, wherein:
the mechanical drive means comprises gearing, and the lead screw engaged with the movable member.

3. A prosthetic apparatus according to claim 2, wherein:
the fixed member and the movable member are elongated and in telescoping relation.

4. A prosthetic apparatus according to claim 3, wherein:
the fixed member and movable member are rectilinear in cross-section to prevent relative rotation therebetween.

5. A prosthetic apparatus according to claim 1, wherein:
said support frame is on the upper portion of the movable member and has at least one arm extending outwardly to support an arm of the user.

6. A prosthetic apparatus according to claim 5, and further including a joy-stick assembly on one of the arms.

7. A prosthetic apparatus according to claim 1, and further including:

a pelvic support extending outwardly from the movable member to the pelvic area of the user for support of the user.

8. A prosthetic apparatus according to claim 1, and further including:

knee support means extending outwardly from the movable member to support the knees of the user while in standing position.

9. A prosthetic device according to claim 1, and further including:

at least one belt to retain the user relative to the support frame.

10. A prosthetic apparatus according to claim 1, wherein:

said ground wheels include two wheels power-rotated by separate motors for controlling forward and rearward movement of the apparatus, and for steering the apparatus by rotating the wheels at different speeds.

11. A prosthetic apparatus for positioning and supporting a user in standing and seated positions, comprising:

a base having two pivotable wheels and two powered wheels, a lifter comprising a fixed member extending upwardly from the base, and a movable lift member in telescoping relation with the fixed member, said lift member and movable member being of rectilinear cross-section to prevent relative rotation, a drive mechanism for moving the movable member relative to the fixed member, the drive mechanism including a lead screw threadedly engaging the movable member, a support frame on the upper portion of the movable member and having at least one arm extending outwardly to support the arms of the user, a seat having front and rear edge portions, said rear edge portion being pivotally connected relative to the movable member, at least one strut having an upper end portion pivotally connected with the outer edge portion of the seat and having an opposite end portion pivotally connected relative to a lower portion of the fixed member for movement of the seat between an extended user-seated position and a retracted user-standing position upon movement of the movable lift member downwardly and upwardly, and a controller operable by the user to operate the lifter to move the movable member upwardly and downwardly, to move the seat between user-standing and user-seated positions, and to control movement of the apparatus.

12. A prosthetic apparatus according to claim 11, and further including a joy-stick assembly on the at least one arm.

13. A prosthetic apparatus according to claim 11, wherein said powered wheels are rear wheels, and each of said rear wheels is operated by a separate electrical motor to control direction of the rotation of each of the wheels for control of direction of movement and for maneuvering of the apparatus.

14. A prosthetic apparatus according to claim 11, and further including:

control means comprising a joy-stick assembly on the said arm and an electronic control unit mounted on the frame.

15. A prosthetic apparatus according to claim 11, and further including:

knee support means extending outwardly from the movable member to support the knees of the user while in standing position.

16. A prosthetic apparatus according to claim 11, and further including:

a pelvic support extending outwardly from the movable member to the pelvic area of the user to support the user.

17. A prosthetic apparatus for positioning and supporting a user in standing and seated positions, comprising:

a base having two pivotable front wheels and two powered rear wheels, each of the rear wheels being rotatable by a separate electrical motor to control the direction and speed of rotation of each respective wheel, a lifter comprising afixed member extending upwardly from the base, and a lift member in telescoping relation with the fixed member, said fixed member and movable member having rectilinear cross-section portions to prevent relative rotation, drive means comprising a lead screw for moving the movable member relative to the fixed member and threadedly engaging the movable member, a support frame on the upper portion of the movable member having two spaced arms extending outwardly to support the arms of the user, a seat having front and rear edge portions, said rear edge portion being pivotally connected relative to the movable member, at least one strut having upper end portions pivotally connected with the outer edge portion of the seat and having an opposite end portion pivotally connected relative to a lower portion of the fixed member for movement of the seat between an extended user-seated position and a retracted user-standing position upon movement of the lift member downwardly and upwardly, and a controller including a control unit mounted on the frame and on said at least one arm, the power means being controllable by the user to operate the lifter to move the movable member upwardly and downwardly, to move the seat between user-standing and user-seated positions, and to control movement and steering of the apparatus and the direction and speed of rotation of each of the respective ground wheels.

18. A prosthetic apparatus according to claim 17, and further including:

knee support means extending outwardly from the movable lift member to support the knees of the user while in standing position.

19. A prosthetic apparatus according to claim 17, and further including:

a pelvic support extending outwardly from the movable lift member to the pelvic area of the user to support the user.

20. A prosthetic apparatus for positioning, supporting and moving a user in standing and seated positions, comprising:

a frame having ground wheels thereon, a fixed member extending from the frame, a lift member mounted for movement relative to the fixed member, a mechanical drive mechanism comprising a lead screw for moving the lift member relative to the fixed member, a drive motor operable by the user to operate said mechanical drive mechanism to move the lift member relative to said fixed member, a seat having front and rear portions, said rear portion being pivotally mounted relative to said lift member, said seat front portion being pivotally connected with the at least one strut pivotally connected with said frame for movement of the seat between its extended user-seated position and its retracted user-standing position, and a control system operable by the user for moving the lift member and said seat between their user-standing and user-seated positions, and for controlling movement of the prosthetic apparatus by said ground wheels.

21. An apparatus according to claim 20, and further including:

a pelvic support extending outwardly from the lift member to support the user.

22. An apparatus according to claim 20, and further including:

a knee support extending outwardly from the fixed member to support the knees of the user while in standing position.

23. An apparatus according to claim 20, and further including:

a pelvic support extending outwardly from the lift member to support the user, and a knee support extending outwardly from the lift member to support the knees of the user while in standing position.

* * * * *